United States Patent [19]

Gibson

[11] 4,411,480

[45] Oct. 25, 1983

[54] MEANS FOR ATTACHING TELEVISION RECEIVER CABINET BACK PANELS

[75] Inventor: Kenneth L. Gibson, Chicago, Ill.

[73] Assignee: Zenith Radio Corporation, Glenview, Ill.

[21] Appl. No.: 371,701

[22] Filed: Apr. 26, 1982

[51] Int. Cl.³ .................. A47B 81/06; H01R 13/44
[52] U.S. Cl. .............................. 312/7.2; 312/7.1; 312/242; 339/36
[58] Field of Search ................ 312/7.2, 7.1, 242; 339/36

[56] References Cited

U.S. PATENT DOCUMENTS

| | | | |
|---|---|---|---|
| 3,165,574 | 1/1965 | Carling | 339/36 |
| 3,422,358 | 1/1969 | Sabonis | 312/7.1 |
| 3,703,323 | 11/1972 | Gallas | 312/7.2 |
| 3,768,064 | 10/1973 | Pabich | 339/312 |
| 4,209,154 | 6/1980 | Hehl | 312/242 |
| 4,313,584 | 2/1982 | Fukunaga | 312/242 |

Primary Examiner—Victor N. Sakran

[57] ABSTRACT

Quick-release means are disclosed for use in a television receiver having a molded plastic cabinet with an access opening in the back. The cabinet includes a removable back panel for covering the opening. Quick-release means for attaching the panel to the cabinet back comprise flexible molded extensions of the cabinet include the following. A pair of face-to-face catch means have a projecting flange on each face for flexing into mutual engagement. The catch means include a first member of the pair extending from a flexible edge of the cabinet and a second member extending from the back for joining in snap engagement. A pair of guide means extending from the back panel and spaced on either side of the second member have a taper for guiding the panel and the catch means into sliding engagement. The taper also provides for exerting pressure on the flexible edge to inhibit disengagement. Spring means extending from the cabinet adjacent to the first member provide for exerting disengaging pressure on the catch means and the panel. Pocket means in the back panel leading to the catch means provide for receiving a parting tool for flexing the first member of the catch means out of engagement against the pressure of the taper of the guide means on the flexible edge of the panel. The spring means urges the catch means and the panel into disengagement when the parting tool is inserted in the pocket means. The panel can be re-engaged by extending pressure on the panel against the spring means for snap-engagement of the catch means.

1 Claim, 8 Drawing Figures

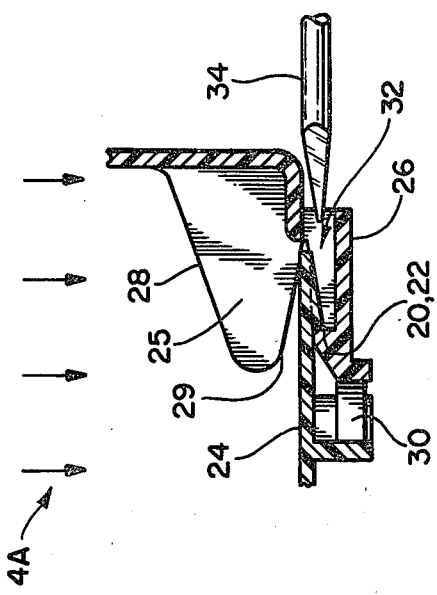
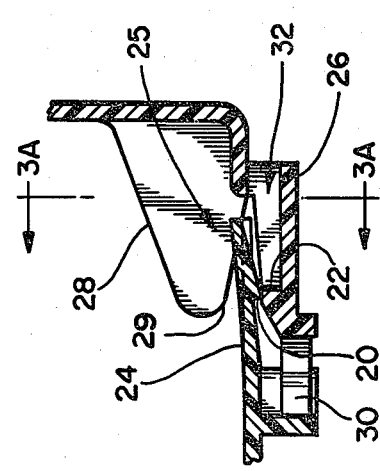
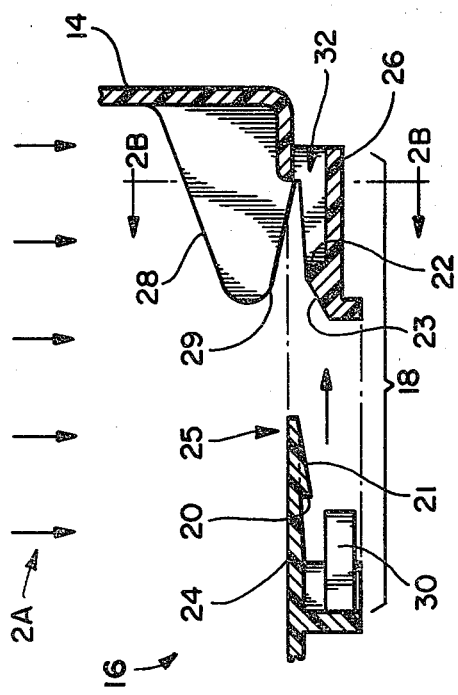
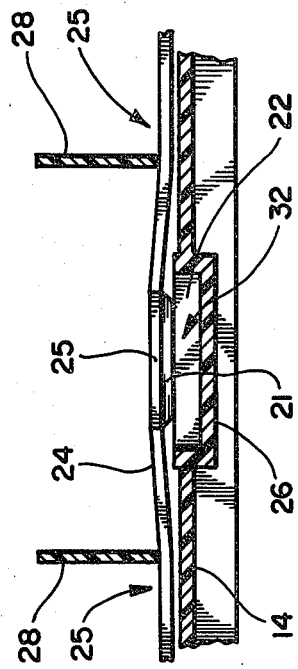
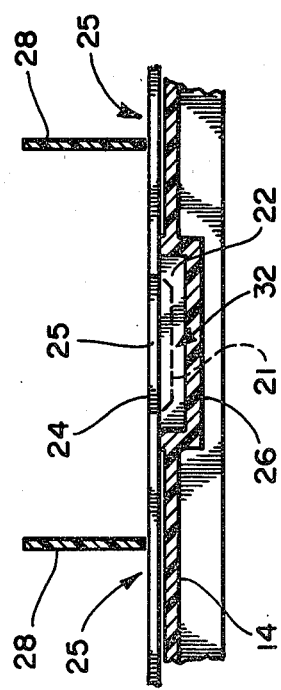

MEANS FOR ATTACHING TELEVISION RECEIVER CABINET BACK PANELS

BACKGROUND OF THE DISCLOSURE AND PRIOR ART STATEMENT

This disclosure relates generally to television receivers, and is particularly directed to means for attaching the backs of television receiver cabinets.

A television receiver commonly consists of a cabinet made of wood, metal or a plastic having an open back for access to the components. The largest of these components is the cathode ray picture tube which has a substantially rectangular face panel with a rearwardly extending flange attached to a funnel portion and a neck portion oriented on the axis of the tube. The electronic section of the receiver is typically subdivided into parts placed at convenient locations beneath and at the sides of a cathode ray tube. The open back is normally covered by a panel that restricts access to the components.

Access is restricted to prevent the entry into the cabinet by unauthorized persons who may suffer injury because of the 117 volt AC potential located at various points on the electrical chassis, and the very high voltage in the range of 25–30 kilovolts applied to the cathode ray tube for establishing the anode potential. However, while denying entry to unauthorized persons, the covering panel must be easily and quickly removable by service technicians. Also, easy access by authorized persons must be facilitated during manufacture as it is often necessary to install and remove the back several times to make final adjustments.

Another requirement is that the panel that covers the back must be securely attached and able to resist dislodging forces experienced during handling and shipping. That these forces are considerable is shown by the fact that a television receiver can experience shocks of the magnitude of 30 g's during shipment.

A further requirement is that the attachment must be firm; otherwise, the panel may rattle in response to the vibration originating in the loudspeaker cones. Sympathetic vibration of back panel members can be very annoying to television receiver users.

Other requirements include the need for design simplicity so that the parts are relatively inexpensive to manufacture. Finally, the back should be removable without the need for special tools.

Pabich in U.S. Pat. No. 3,768,064 discloses a safety back for an appliance cabinet, such as a TV cabinet. According to Pabich, the appliance cabinet cannot be opened without following a procedure involving several steps in predetermined sequence and, in some cases, without having a special tool. The object is to provide a cabinet back which cannot be removed by small children or incompetent persons who might be injured by electrical shock if they put their hands inside the cabinet. In one embodiment, the back panel of the cabinet has means for precluding release of the panel from the cabinet unless the panel is first slipped to a release position, and a mechanical interlock means for preventing slippage of the panel. The mechanical interlock may comprise a socket on a power cord or ones of several types of fasteners having different slot configurations.

OBJECTS OF THE INVENTION

It is a general object of this invention to provide for improved means for attaching the back panels of television receiver cabinets.

It is a less general object to provide means for attaching cabinet backs which are inexpensive to manufacture.

It is a more specific object of this invention to provide back panel attachment means which are resistant to entry by unauthorized persons, yet allow for easy access by service technicians.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

FIG. 2 is a cross-sectional view in elevation depicting the quick-release means according to the invention when disengaged; FIG. 2B is an elevational view taken along lines 2B—2B of FIG. 2;

FIG. 3 is a view similar to FIG. 2 except that the quick-release means according to the invention are depicted just before full engagement; FIG. 3A is an elevational view taken along lines 3A—3A of FIG. 3; and FIG. 4 is a view similar to FIGS. 2 and 3 but with the quick-release means according to the invention shown in full engagement.

DESCRIPTION OF THE PREFERRED EMBODIMENT

Figure 1:
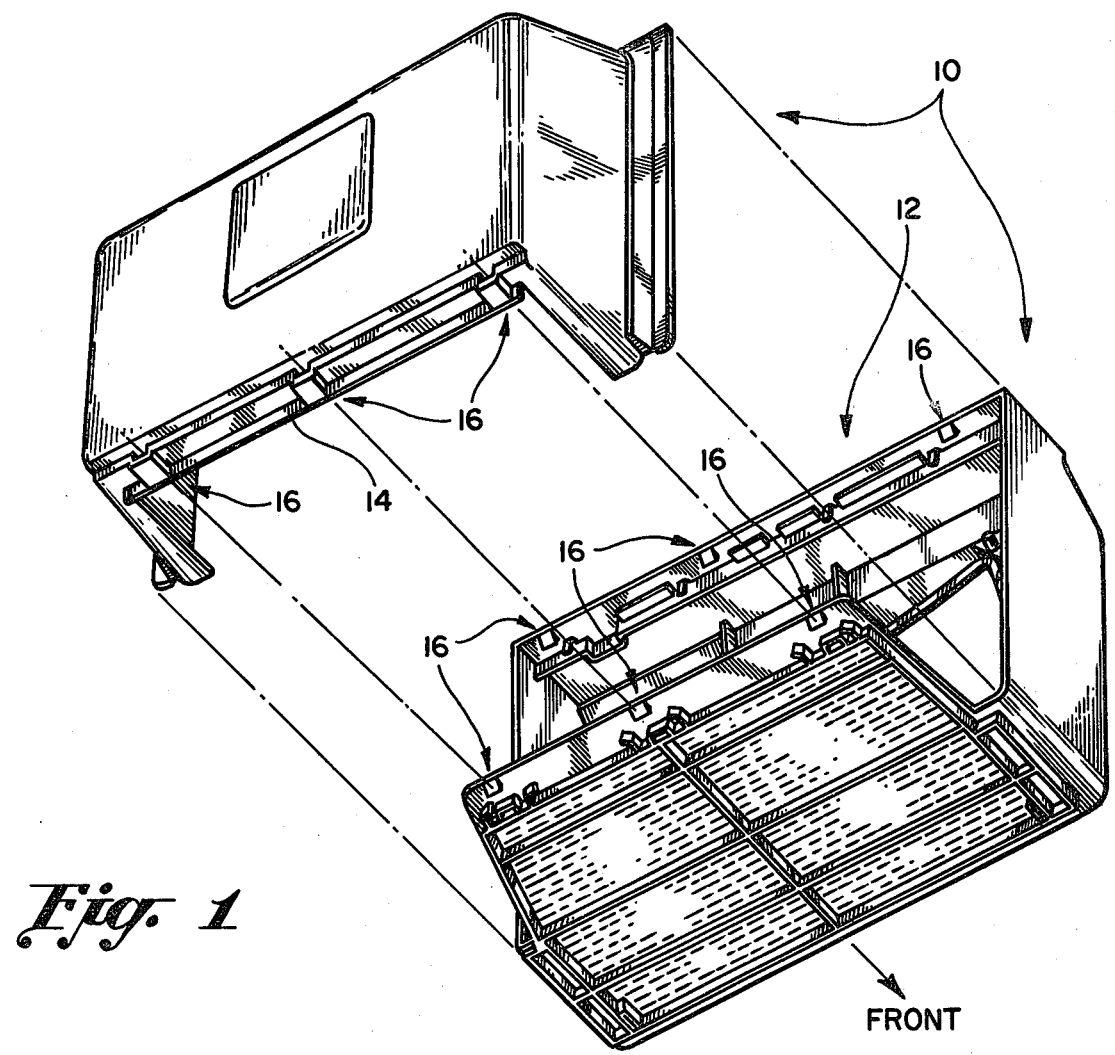
FIG. 1 is a view in perspective depicting a television receiver cabinet as seen from the bottom, with the back panel exploded therefrom, and indicating the preferred location of the quick-release means according to the invention for attaching the panel.

As shown by FIG. 1, a molded plastic cabinet 10 of a television receiver has an access opening 12 in the back thereof for access to internal components. The cabinet 10 is depicted as having a removable back panel 14 for covering opening 12. At least one quick-release means 16 according to the invention, indicated by way of example as comprising six such means, are for use in a television receiver for attaching panel 14 to cabinet 12. The quick-release means 16, which are substantially identical in form and function, comprise flexible molded extensions of the cabinet 10 (and its back 14), and include the components described in the following paragraphs.

Quick-release means 16 according to a preferred embodiment of the invention is shown by FIGS. 2–4. With reference to FIG. 2, in which the quick-release means 16 is indicated as being disengaged, quick-release means 16 is depicted as comprising a pair of face-to-face catch means 18, indicated by the bracket. Catch means 18 have a projecting flange on each face, referred to as flange 20 and 22, respectively. Flanges 20 and 22 will be noted as having a taper 21 and 23, respectively, for allowing flanges 20 and 22 to slide and flex past each other into mutual engagement. Catch means 18 is noted as including a first member 24 of the pair extending from a flexible edge 25 of cabinet 10. Catch means 18 also include a second member 26 of the pair of catch means 18 which extends from back panel 14 for joining in snap engagement with first member 24 of catch means 18, as will be shown.

Figure 2A:
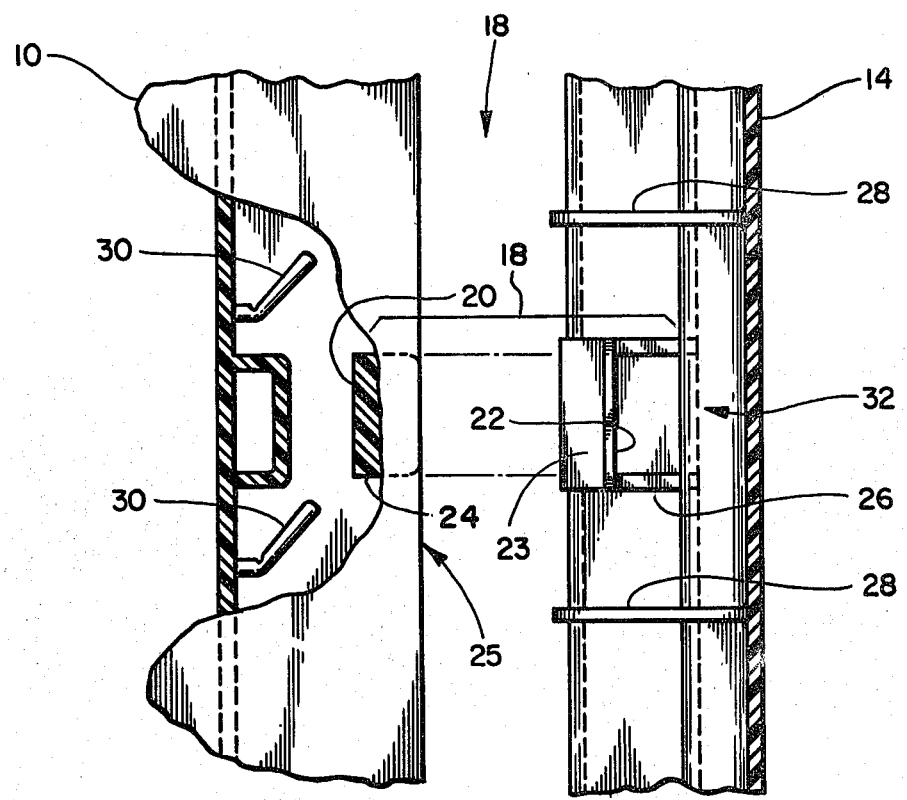
FIG. 2A is a plan view of the FIG. 2 representation as seen from the viewpoint indicated by arrows 2A in FIG. 2.

The relationship of the pair of catch means 18 with a cabinet 10 is depicted in FIG. 2A, which is as seen from the viewpoint indicated by the arrows 2A of FIG. 2. The first member 24 of catch means 18 will be perceived as extending from a flexible edge 25 of cabinet 10, and the second member 26 of catch means 18 will be perceived as extending from the back panel 14.

The quick-release means according to a preferred embodiment of the invention also includes a pair of guide means 28 extending from back panel 14, and shown as being spaced on either side of the second member 26. Guide means 28 will be noted as having, according to the invention, a taper 29 for guiding catch means 18 into sliding engagement. Taper 29 also provides for exerting pressure on flexible edge 25 of cabinet 10 for inhibiting disengagement of catch means 18, as will be described.

Spring means 30 according to the invention are depicted in FIG. 2A as extending from cabinet 10 adjacent to the first member 24 of catch means 18. Pocket means 32, indicated as being located in panel 14, is shown as leading to catch means 18 for receiving a parting tool for disengaging panel 14 from cabinet 10.

Functional details of the means according to the invention for engaging and disengaging panel 14 are described as follows.

FIG. 2B is a view taken along section lines 2B-2B of FIG. 2, noted as showing the catch means 18 as being disengaged. Panel 14 is re-engaged by exerting pressure on panel 14 against spring means 30 for snap engagement of catch means 18 according to the invention. The engagement sequence is indicated by FIGS. 3 and 3A, and 4 and 4A. FIG. 3A depicts the projecting flanges 20 and 22 sliding and flexing preparatory to mutual engagement. The flexing is done primarily by first member 24, as indicated by the associated dash lines in FIG. 3; second member 26 also flexes.

With specific reference now to FIG. 3A, it will be noted that the guide means 28 exerts pressure on flexible edge 25 at the points of contact of the guide means 28 with flexible edge 25 as taper 21 and 23 slide together. Spring means 30 is indicated in FIG. 3 as being depressed by a face of second member 26.

Figure 4A:
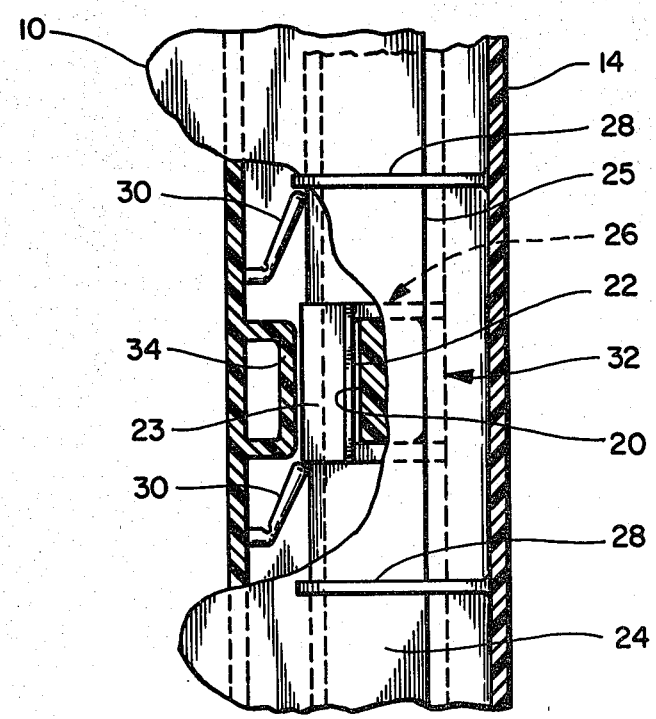
FIG. 4A is a plan view of the FIG. 4 representation as seen from the viewpoint indicated by arrows 4A in FIG. 4.

FIG. 4A, which is a perception of the catch means 18 from the viewpoint indicated by arrows 4A in FIG. 4, depicts the catch means 18 as engaged. Spring means 30 will be noted as being compressed, and the flexible edge 25 is restored to the relatively straight-line, unflexed condition indicated by FIG. 2B. Stop 34 provides for limiting the clearance between flanges 20 and 22 when catch means 18 is engaged.

To effect disengagement of the back panel 14 from cabinet 10, a parting tool 34 is inserted into the pocket means 32. Parting tool 34, which may comprise a screwdriver or other tool having a flat blade, provides for flexing first member 24 of catch means 18 out of engagement with second member 26. It will be noted that the catch means 18 are inaccessible to a finger, for example, as pocket means 32 permits only a very limited access to catch means 18.

However, there is more involved than the mere flexing apart of the members 24 and 26 to effect disengagement—the flexible edge 25 from which the first member 24 extends functions to inhibit disengagement of catch means 18 according to the invention. This inhibiting is indicated by FIG. 3A; it will be noted that it is necessary to "bow up" flexible edge 25 against the hold-down pressure of guide means 28, preferably by rotating the blade of the parting tool 34 in pocket means 32. This feature according to the invention enables the cabinet to withstand shocks greater than 30 g's without the disengagement of the catch means 18 and the panel 14. Yet the panel 14 can be quickly released without the need for special tools.

The quick-release means according to the invention provides another convenience for the service technician. It will be recalled that six quick-release means 16 are shown in FIG. 1; the spring means 30, by virtue of the exertion of disengaging pressure on the catch means 18 and the panel 14, urges each quick-release means out of engagement so that the first ones released cannot re-engage before disengagement of the remaining ones. Also, once removed, the panel 14 can be quickly re-engaged by exerting pressure on the panel 14 against spring means 30 for snap engagement of catch means 18.

It is noted that the number of quick-release means 16, indicated as being six by way of example, can comprise a greater or lesser number, with the number being dependent upon the relative sizes of the cabinet and the panel.

The cabinet 10 and its back panel 14 are preferably molded from a material such as high-impact Polystyrene (TM) which lends itself to the forming of the flexible molded extensions such as catch means 18 and the spring means 30. The inherent flexibility of such material also allows limited yielding under pressure of the parts to which the extensions are attached, such as the flexible edge 25 of cabinet 10. As a result, all parts can flex cooperatively to provide positive latching, yet quick-releasability.

Although the invention has been described in terms of a preferred embodiment, it will be apparent to those skilled in the art that many modifications and alterations may be made without departing from the invention in its broader aspects. Accordingly, it is intended that all such modifications and alterations be considered as within the spirit and scope of the invention as defined by the appended claim.

I claim:

1. For use in a television receiver having a molded plastic cabinet with an access opening in the back and having a removable back panel for covering said opening, at least one quick-release means for attaching said panel to said cabinet comprising flexible molded extensions of said cabinet, said quick-release means including:

a pair of face-to-face catch means having a projecting flange on each face tapered for sliding and flexing into mutual engagement, said catch means including a first member extending from a flexible edge of said cabinet, and a second member extending from said panel for joining in snap engagement with said first member;

a pair of guide means extending from said panel and spaced on either side of said second member, said guide means having a taper for guiding said panel and said catch means into sliding engagement, and for exerting pressure on said flexible edge for inhibiting disengagement of said catch means;

spring means extending from said cabinet adjacent to the first member for exerting disengaging pressure on said catch means and said panel;

pocket means in said panel leading to said catch means for receiving a parting tool for flexing said first member out of engagement with said second member;

whereby said spring means urges said catch means and said back panel into disengagement from said cabinet when said parting tool is inserted into said pocket means, and said panel can be re-engaged by exerting pressure on said panel against said spring means for snap engagement of said catch means.

* * * * *